(12) United States Patent
Hanada

(10) Patent No.: US 10,409,536 B2
(45) Date of Patent: Sep. 10, 2019

(54) IMAGE FORMING APPARATUS FOR DISPLAYING PREVIEW IMAGES OF APPLIED SETTINGS FOR PRINTING, AND ELECTRONIC APPARATUS

(71) Applicant: KYOCERA Document Solutions Inc., Osaka (JP)

(72) Inventor: Naoto Hanada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/976,258

(22) Filed: May 10, 2018

(65) Prior Publication Data
US 2018/0329661 A1  Nov. 15, 2018

(30) Foreign Application Priority Data

May 15, 2017 (JP) ................. 2017-096728

(51) Int. Cl.
*G06F 3/12* (2006.01)
*H04N 1/23* (2006.01)
*H04N 1/00* (2006.01)
*H04N 1/387* (2006.01)
*H04N 1/60* (2006.01)

(52) U.S. Cl.
CPC .......... *G06F 3/1258* (2013.01); *G06F 3/1205* (2013.01); *G06F 3/1256* (2013.01); *G06F 3/1285* (2013.01); *H04N 1/00352* (2013.01); *H04N 1/00453* (2013.01); *H04N 1/00456* (2013.01); *H04N 1/00811* (2013.01);
(Continued)

(58) Field of Classification Search
CPC ............ H04N 1/0044; H04N 1/00442; H04N 1/00453; G06F 3/1208; G06F 3/1258; G06F 3/1256
See application file for complete search history.

(56) References Cited

U.S. PATENT DOCUMENTS

| | | | |
|---|---|---|---|
| 10,051,152 B1 * | 8/2018 | Snowball | ............... H04N 1/393 |
| 2004/0119846 A1 * | 6/2004 | Inou | .................... H04N 1/00408 |
| | | | 348/231.99 |

(Continued)

FOREIGN PATENT DOCUMENTS

| | | |
|---|---|---|
| JP | 2004-348405 A | 12/2004 |
| JP | 2009-296370 A | 12/2009 |

*Primary Examiner* — Benjamin O Dulaney
(74) *Attorney, Agent, or Firm* — IP Business Solutions, LLC

(57) ABSTRACT

An image forming apparatus includes an image forming unit, a display unit, an operation unit, and a controller. The controller causes, before printing an image, the display unit to reduce and display, with respect to each of setting items for printing, images to each of which a processing indicated by one of the setting items is applied. When a user designates one of the images to which the processing indicated by one of the setting items is applied, the controller accepts an instruction to print the image, reflecting the processing indicated by the setting item corresponding to a designated image, and causes the display unit to reduce and display the images to each of which the processing indicated by a remaining setting item not designated by the user, and the processing indicated by the designated setting item corresponding to the designated image, are applied, with respect to remaining setting items.

13 Claims, 8 Drawing Sheets

(52) U.S. Cl.
CPC ......... *H04N 1/2338* (2013.01); *H04N 1/3875* (2013.01); *H04N 1/6011* (2013.01)

(56) References Cited

U.S. PATENT DOCUMENTS

| | | | |
|---|---|---|---|
| 2007/0081740 A1* | 4/2007 | Ciudad | H04N 1/00286 382/276 |
| 2011/0099523 A1* | 4/2011 | van Zee | G03D 15/005 715/838 |
| 2011/0279363 A1* | 11/2011 | Shoji | G06F 3/04886 345/156 |
| 2013/0163019 A1* | 6/2013 | Tago | H04N 1/00442 358/1.13 |
| 2015/0172487 A1* | 6/2015 | Kirihara | H04N 1/00514 358/1.14 |
| 2015/0242712 A1* | 8/2015 | Awano | G06K 15/002 358/1.15 |
| 2017/0147168 A1* | 5/2017 | Yamanishi | H04N 1/00448 |

* cited by examiner

Fig.5

| | B/W | COLOR | CONSOLIDATION | BLANK MARGIN | ONE SIDE | DUPLEX | 90° | 180° |
|---|---|---|---|---|---|---|---|---|
| B/W | | NO | YES | YES | YES | YES | YES | YES |
| COLOR | NO | | YES | YES | YES | YES | YES | YES |
| CONSOLIDATION | YES | YES | | NO | YES | YES | YES | YES |
| BLANK MARGIN | YES | YES | NO | | YES | YES | YES | YES |
| ONE SIDE | YES | YES | YES | YES | | NO | YES | YES |
| DUPLEX | YES | YES | YES | YES | NO | | YES | YES |
| 90° | YES | YES | YES | YES | YES | YES | | NO |
| 180° | YES | YES | YES | YES | YES | YES | NO | |

DT

IMAGE FORMING APPARATUS FOR DISPLAYING PREVIEW IMAGES OF APPLIED SETTINGS FOR PRINTING, AND ELECTRONIC APPARATUS

INCORPORATION BY REFERENCE

This application claims priority to Japanese Patent Application No. 2017-096728 filed May 15, 2017, the entire contents of which are incorporated by reference herein.

BACKGROUND

The present disclosure relates to an image forming apparatus and an electronic apparatus that allow, when printing or displaying an image, selective application of setting items, such as color printing, black and white (hereinafter, B/W), one-side printing, and duplex printing, and more particularly to a technique to facilitate the selection of the setting items.

The image forming apparatuses are normally configured for the user to select, before printing an image, a plurality of setting items related to the printing job, such as color printing, B/W printing, one-side printing, duplex printing, consolidation, blank margin, 90 degrees rotation, and so forth. The user decides whether the selected setting is appropriate, on the basis of pre-imagination of the image to which the selected processing has been applied, with respect to each of the setting items. Therefore, the user is unable to confirm the printed state of the image, until the image is actually printed.

Accordingly, a technique has been developed to arrange a preview display function for visually confirming the setting, so as to display the image based on the selected setting, together with the image based on the standard setting. With such a preview display function, the image based on the standard setting, and the image that reflects the selected setting can be comprehensively displayed.

In addition, a technique has been developed to generate a preview image, in the case where the duplex printing is specified as the setting for the printing, by changing the display form of at least one of the front face image and the rear face image, and synthesizing those images.

SUMMARY

The disclosure proposes further improvement of the foregoing technique. In an aspect, the disclosure provides an image forming apparatus including an image forming unit, a display unit, an operation unit, and a controller. The image forming unit prints a source document image on a recording sheet. The operation unit is to be operated by a user. The controller (i) causes, before causing the image forming unit to print the source document image, the display unit to reduce and display, with respect to each of a plurality of setting items related to printing of the source document image, source document images, to each of which a processing indicated by one of the plurality of setting items is applied, (ii) accepts, when the user designates, by operating the operation unit, one of the source document images to each of which the processing indicated by one of the plurality of setting items is applied, an instruction to print the source document image to which the processing indicated by a designated setting item corresponding to a designated source document image is applied, and (iii) causes the display unit to reduce and display the source document images, to each of which the processing indicated by one of remaining setting items not designated by the user, and the processing indicated by the designated setting item corresponding to the designated source document image, are applied, with respect to the remaining setting items.

In another aspect, the disclosure provides an electronic apparatus including a display unit, an operation unit, and a controller. The operation unit is to be operated by a user. The controller (i) causes the display unit to reduce and display, with respect to each of a plurality of setting items related to image processing, images to each of which a processing indicated by one of the plurality of setting items is applied, and (ii) causes the display unit to reduce and display, when the user designates, by operating the operation unit, one of the images to each of which the processing indicated by one of the plurality of setting items is applied, the images to each of which the processing indicated by one of remaining setting items not designated by the user, and the processing indicated by the setting item designated by the user, are applied, with respect to each of the images corresponding to the remaining setting items.

BRIEF DESCRIPTION OF THE DRAWINGS

FIG. 5 is a data table used to decide whether a setting item can be combined with another setting item, with respect to each of the setting items.

DETAILED DESCRIPTION

Hereafter, an embodiment of the disclosure will be described, with reference to the drawings.

Figure 1:
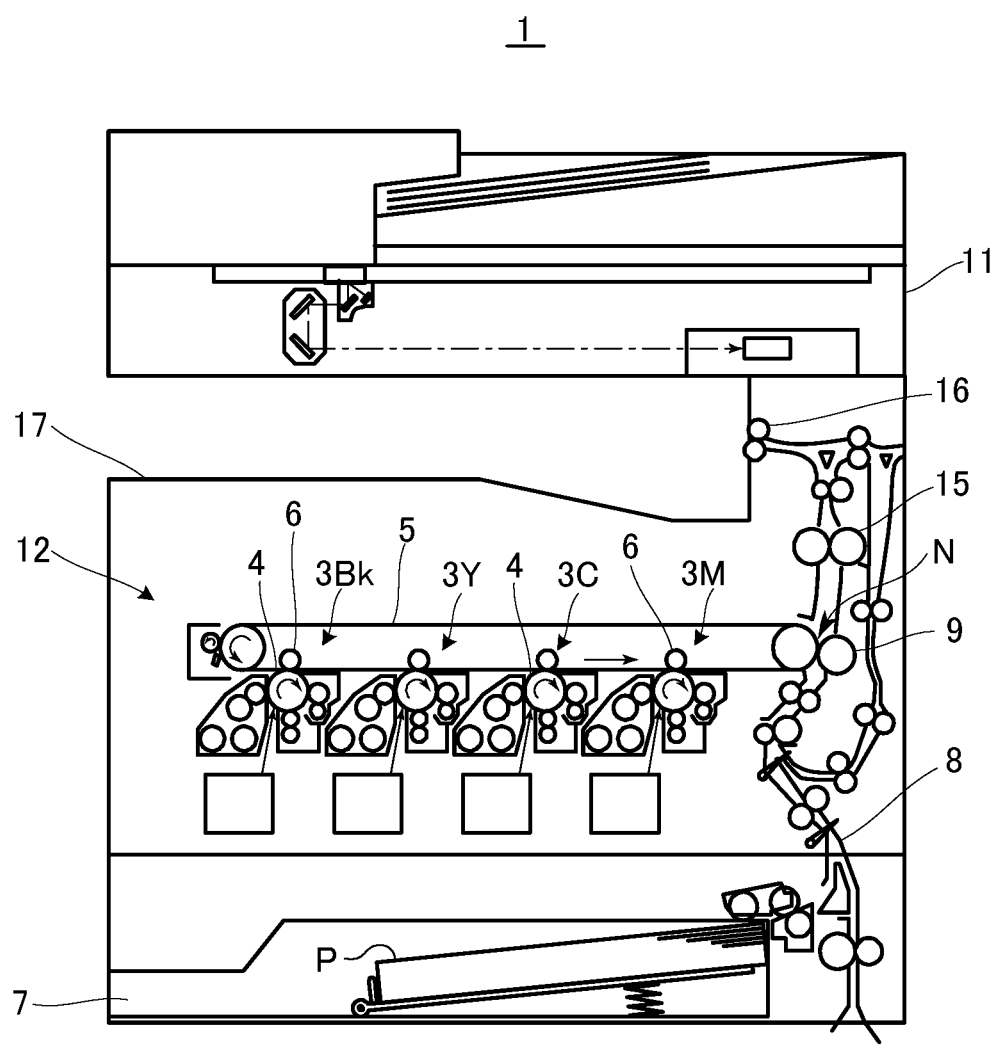
FIG. 1 is a cross-sectional view showing an image forming apparatus according to an embodiment of the disclosure.

FIG. 1 is a cross-sectional view showing an image forming apparatus according to the embodiment of the disclosure. The image forming apparatus 1 is a multifunction peripheral (MFP) configured to execute a plurality of functions including, for example, a copying function, a printing function, a scanning function, and a facsimile function. The image forming apparatus 1 includes an image reading unit 11 and an image forming unit 12.

The image reading unit 11 includes a scanner for optically reading a source document, and generates image data representing the image of the source document.

The image forming unit 12 is configured to print an image based on the image data generated by the image reading unit 11 or received from outside, on a recording sheet, and includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5 via a primary transfer roller 6. Thus, the color toner image is formed on the intermediate transfer roller 5. The color toner image is transferred to the recording sheet P transported along a transport route 8 from a paper feed unit 7, at a nip region N defined between the intermediate transfer roller 5 and a secondary transfer roller 9.

Thereafter, the recording sheet P is press-heated in a fixing device 15, so that the toner image on the recording sheet P is fixed by thermal compression, and then the recording sheet P is discharged to an output tray 17 through a discharge roller pair 16.

Figure 2:
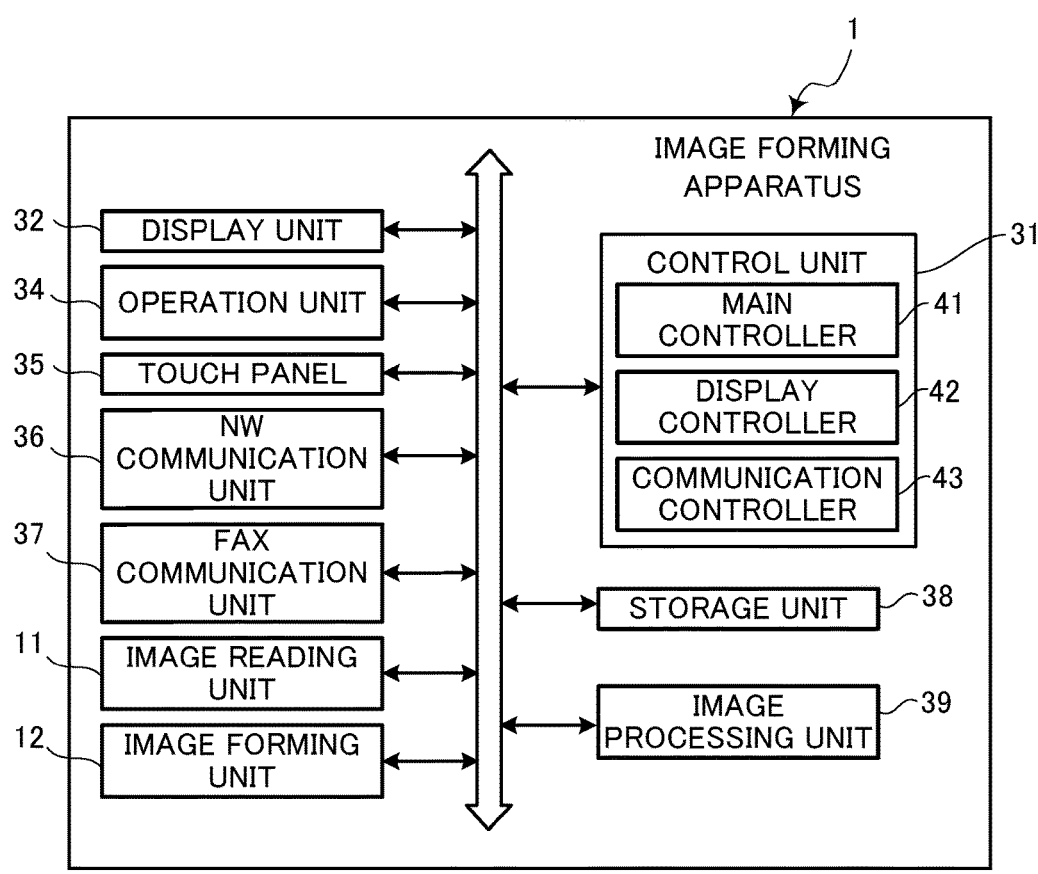
FIG. 2 is a block diagram showing an essential internal configuration of the image forming apparatus according to the embodiment.

FIG. 2 is a block diagram showing an essential internal configuration of the image forming apparatus 1. As shown in FIG. 2, the image forming apparatus 1 includes a control unit 31, a display unit 32, an operation unit 34, a touch panel 35, a NW communication unit 36, a FAX communication unit 37, a storage unit 38, an image processing unit 39, the image reading unit 11, and the image forming unit 12. The mentioned components are configured to transmit and receive data or signals to and from each other, via a bus.

The display unit 32 is, for example, constituted of a liquid crystal display (LCD) or an organic light-emitting diode (OLED) display.

The operation unit 34 includes, for example, a menu key for invoking the initial screen of the display unit 32, and a start key, to receive an execution instruction for the image forming or source document reading, from the user.

A touch panel 35 is overlaid on the screen of the display unit 32. The touch panel 35 is based on a resistive film or electrostatic capacitance, and configured to detect a contact (touch) of the user's finger, along with the touched position, to input the user's instruction to for example the GUI on the screen of the display unit 32. Accordingly, the touch panel 35 also serves as the operation unit 34 for inputting the user's operation performed on the screen of the display unit 32. The user's operation in this case includes, for example, a touch operation, a slide operation (flick and swipe operation inclusive), a drag operation, a pinch-out operation, and a pinch-in operation.

The NW communication unit 36 transmits and receives various data to and from non-illustrated other terminal devices, through a network. The FAX communication unit 37 transmits and receives image data to and from non-illustrated other image forming apparatuses or facsimile machines, through a network.

The storage unit 38 includes a large-capacity solid state drive (SSD) or a hard disk drive (HDD), and contains various data and programs The image processing unit 39 retrieves and processes the image read by the document reading unit 5. For example, the image processing unit 39 executes predetermined image processings such as shading correction, to improve the quality of the image formed by the image forming unit 12 on the basis of the image read by the document reading unit 5. In addition, the image processing unit 39 generates reduced images representing a state realized by applying the processing indicated by a plurality of setting items related to the printing, such as color printing, B/W printing, one-side printing, duplex printing, consolidation, blank margin, 90 degrees rotation, and so forth.

The control unit 31 includes a processor, a random-access memory (RAM), a read-only memory (ROM), and so forth. The processor is, for example, a central processing unit (CPU), a MPU, an ASIC, or the like. The control unit 31 acts as a main controller 41, a display controller 42, and a communication controller 43, when the processor executes a program stored in the ROM or the storage unit 38. Here, the mentioned components of the control unit 31 may each be constituted in the form of a hardware circuit, instead of being performed according to the program. In addition, the main controller 41 and the display controller 42 correspond to the controller in the disclosure.

The main controller 41 serves to control the overall operation of the image forming apparatus 1. The display controller 42 controls the display unit 32 so as to cause the display unit 32 to display the GUI and various types of information. The communication controller 43 is configured to control the communication operation of the NW communication unit 36 and the FAX communication unit 37.

With the image forming apparatus 1 configured as above, when the user operates the operation unit 34 and the touch panel 35 to input an instruction to select one of the facsimile function, the copying function, the printing function, and the scanning function, the main controller 41 and the display controller 42 execute the job related to the selected function. For example, when the user inputs the instruction to select the copying function by operating the operation unit 34 and the touch panel 35, thus to instruct execution of a copying job, the main controller 41 causes the image reading unit 11 to read a source document image, and causes the image forming unit 12 to print the source document image on the recording sheet. In the case of the facsimile function, the printing function, and the scanning function, likewise, when the user inputs the instruction to select the function thereby instructing to execute the selected function, the main controller 41 executes the designated job.

With the image forming apparatus 1, in addition, when the user inputs the instruction to select one of the plurality of setting items related to the printing, such as color printing, B/W printing, one-side printing, duplex printing, consolidation, blank margin, and 90 degrees rotation, by operating the operation unit 34 and the touch panel 35, before causing the image forming unit 12 to print the source document image on the recording sheet, the main controller 41 causes the image forming unit 12 to print the source document image on which the processing indicated by the selected setting item has been performed, on the recording sheet. The setting items refer to items indicating the image processing to be executed by the image processing unit 39 on the image to be printed or stored, when the image is printed or stored.

In this embodiment, further, the display controller 42 causes the display unit 32 to display, when the user is to designate the setting item, reduced images representing the source document, to each of which the processing indicated by the setting item is applied, with respect to each of the plurality of setting items. When the user designates, by operating the touch panel 35, one of the images displayed in a reduced size on the display unit 32, the display controller 42 accepts an instruction to print the source document applying the processing indicated by the setting item corresponding to the designated image. With respect to each of the remaining setting items not designated by the user, the display controller 42 causes the display unit 32 to display the reduced images representing the source document, to each of which the processing indicated by one of the remaining setting items, and also the processing indicated by the designated setting item are applied. Therefore, the user can easily recognize how the printed image will look like, when some of the setting items are selectively combined.

Figure 3:
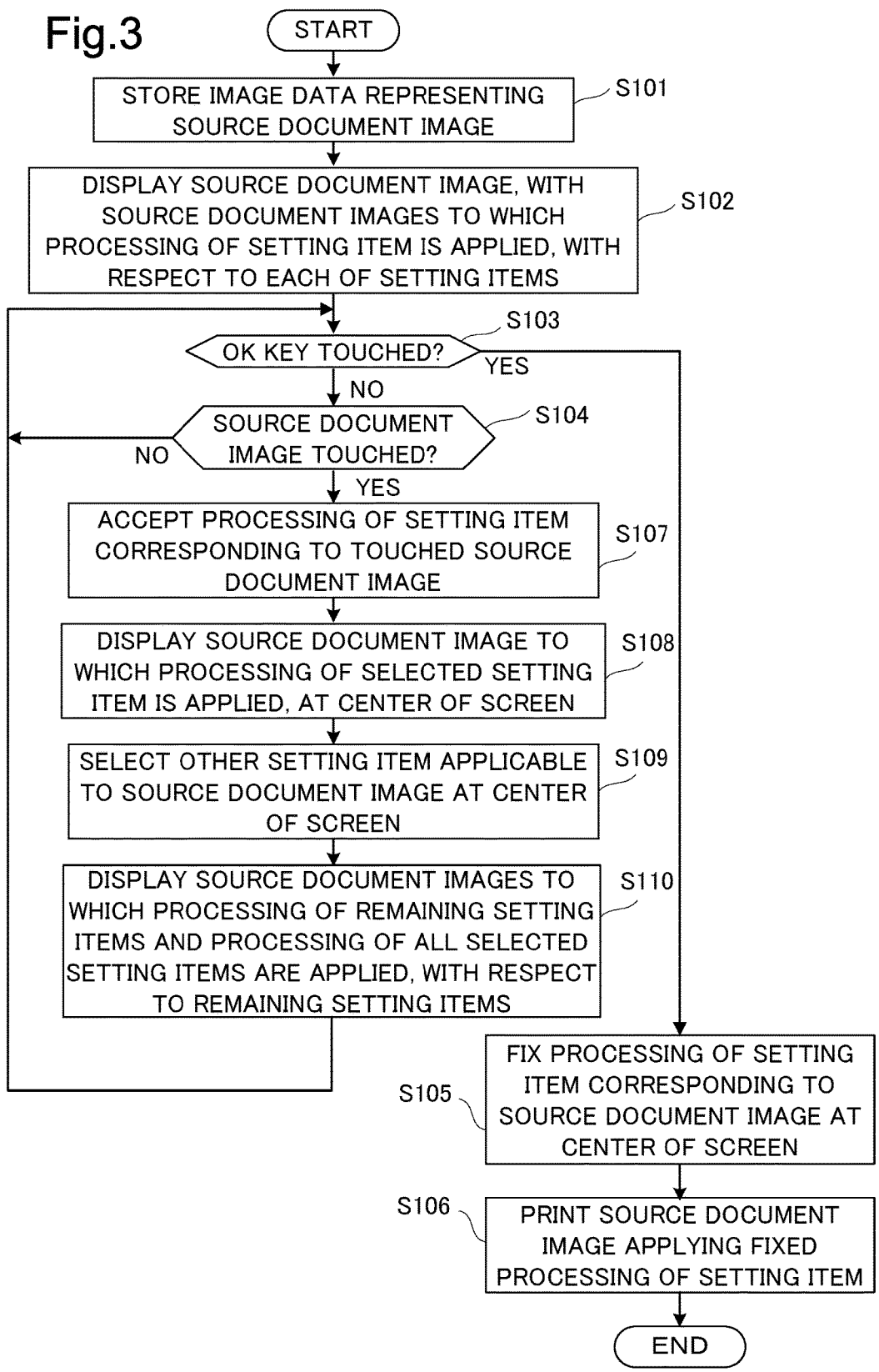
FIG. 3 is a flowchart showing a process of displaying a reduced source document image, to which a processing is applied, with respect to each of a plurality of setting items.

Referring mainly to a flowchart shown in FIG. 3, a process of displaying the reduced image representing the source document, to each of which the processing indicated by the setting item is applied, with respect to each of the plurality of setting items.

First, the user sets a source document on the image reading unit 11, and instructs reading of the source document by operating the operation unit 34. In response to the instruction to read the source document, the main controller 41 activates the image reading unit 11. The image reading unit 11 reads the source document image and generates image data representing the source document image. The image data generated by the image reading unit 11 is stored in the storage unit 38 (S101). In this embodiment, it will be assumed that the image reading unit 11 reads the source document in color, and the image data is stored in the storage unit 38 as data of a color image.

When the image data representing the source document image is stored in the storage unit 38, the display controller 42 causes the display unit 32 to display the reduced source document image based on the image data, in B/W. The display controller 42 causes the display unit 32 to also display the reduced images representing the source document, to each of which the processing indicated by the setting item is applied, on the basis of the image data generated with respect to each of the setting items such as color printing, one-side printing, duplex printing, consolidation, blank margin, and 90 degrees rotation (S102). The display controller 42 generates the B/W image necessary for displaying, on the basis of the color image stored in the storage unit 38. Here, the images captioned as "C" in FIG. 4, FIG. 6, and FIG. 7 indicate that the corresponding images are displayed in color, and the images captioned as "M" indicate that those images are displayed in B/W.

Figure 4:
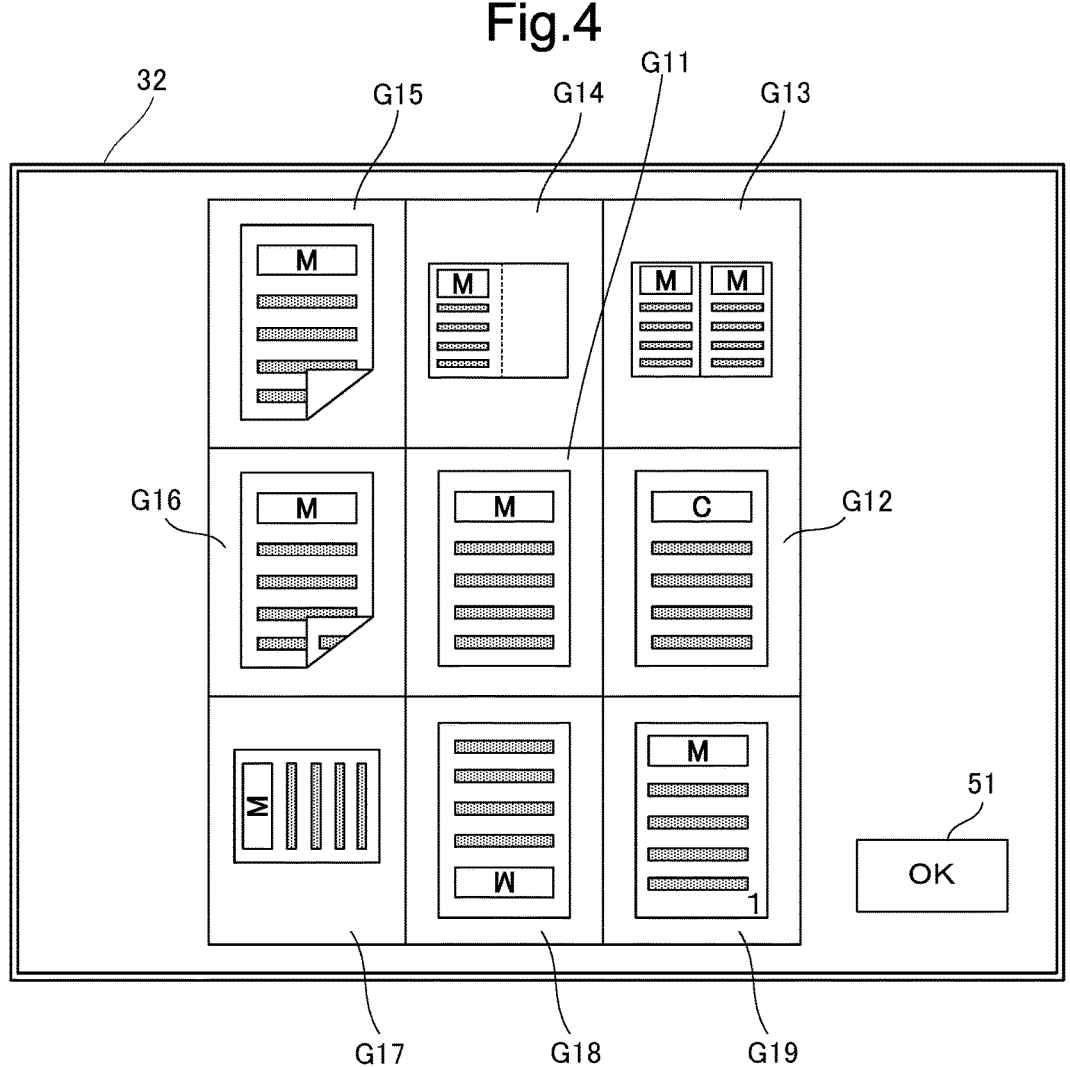
FIG. 4 is a schematic drawing showing a screen of a display unit, displaying a reduced B/W source document image, together with reduced source document images to each of which the processing indicated by the setting item is applied, with respect to each of the plurality of setting items.

FIG. 4 illustrates the screen of the display unit 32 caused by the display controller 42 to display the reduced B/W source document image as above, and also reduced source document images to each of which the processing indicated by the setting item is applied, with respect to each of the plurality of setting items. As shown in FIG. 4, the display controller 42 causes the display unit 32 to display an image G11 of the source document (e.g., page 1) in B/W, at the center of the screen. The display controller 42 causes the display unit 32 to also display images representing the source document G12 to G19, to each of which the processing indicated by another setting item is applied in the screen, around the source document image G11. Further, the display controller 42 creates a display of an OK key 51 on the screen of the display unit 32. The display controller 42 generates the mentioned images, on the basis of the image read by the image reading unit 11.

Here, the source document image G11 is a default image of the source document of a reduced size, on which no processing has been performed by the image processing unit 39, and represents the state realized when the source document image is printed in B/W on the recording sheet. Since the image read by the image reading unit 11 is a color image in this embodiment, the display controller 42 converts the color image into a B/W image (the same applies hereinafter, when a B/W image is to be displayed).

For example, the source document image G12 is a reduced image of the source document, and represents the state realized when the source document image is printed in color on the recording sheet. Since the image read by the image reading unit 11 is a color image in this embodiment, the display controller 42 utilizes this color image.

In addition, the source document image G13 is a reduced B/W image of the source document to which the processing indicated by the setting item of consolidation is applied, and represents the state realized when two of the source document images read by the image reading unit 11 are printed on a single recording sheet. In this embodiment, it will be assumed that the display controller 42 displays the form of 2-in-1, as an example of the consolidation.

Likewise, the source document image G14 represents the source document image to which the processing indicated by the setting item of blank margin is applied, the image G15 represents the image printed on one side, the image G16 represents the image realized by duplex printing, the image G17 represents the image realized by rotation of 90 degrees, the image G18 represents the image realized by rotation of 180 degrees, and the image G19 represents the image to which a page number is added, all of which are displayed in a reduced size by the display controller 42.

The user can recognize, in view of the source document image G11 displayed at the center of the screen of the display unit 32 shown in FIG. 4, how the source document image is printed in B/W on the recording sheet, under the default settings of the setting items. The user can also recognize, in view of the source document image G12 displayed in the screen of the display unit 32 shown in FIG. 4, how the source document looks like when printed in color on the recording sheet. In addition, the user can recognize, in view of the source document image G13, how the source document looks like when two of the source document images are printed in B/W on the recording sheet, under the processing indicated by the setting item of consolidation. Likewise, the user can recognize, in view of the source document images G14 to G19, how the printed image of the source document will look like when the corresponding processing indicated by the setting item is applied, with respect to each of the setting items.

When the source document images G11 and G12 to G19 are thus displayed on the screen of the display unit 32, the main controller 41 stands by for a touch operation on the OK key 51, or a touch operation on one of the source document images G12 to G19 (No at S103 and S104).

For example, when the user touches the OK key 51, the main controller 41 detects the touch operation performed on the OK key 51 through the touch panel 35, and decides that the source document image G11 has been designated (Yes at S103). Then the main controller 41 establishes the default settings of the respective setting items to be applied to the source document image G11 displayed at the center of the screen of the display unit 32, in other words the execution of the printing of the source document image read by the image reading unit 11, in B/W on the recording sheet (S105). The main controller 41 causes the image forming unit 12 to print the source document image in B/W on the recording sheet, according to the image data representing the source document image stored in the storage unit 38 (S106). Since the image read by the image reading unit 11 is a color image in this embodiment, the image data converted by the image processing unit 39 from the color image to the B/W image is utilized for the printing. Here, the image processing of the source document image read by the image reading unit 11, necessary when executing the printing, is performed by the image processing unit 39.

In contrast, when the user touches the source document image G12 for example, the main controller 41 detects the touch operation performed on the source document image G12 through the touch panel 35, to thereby decide that the source document image G12 has been designated (Yes at S104), and accepts the instruction to apply the setting item of color printing, to the source document image G12 designated (S107).

When the setting item of color printing represented by the source document image G12 is designated as above, the display controller 42 causes the display unit 32 to erase the source document image G11, and display the source document image G12 instead, at the center of the screen in a reduced size (S108).

The display controller 42 also looks up a data table DT stored in advance in the storage unit 38, and decides whether the remaining setting items that have not been designated, such as one-side printing, duplex printing, consolidation, blank margin, 90 degrees rotation, 180 degrees rotation, and addition of page number, are compatible with the processing indicated by the designated setting item (in this case, color printing), with respect to each of the remaining setting items, and selects the setting items that have been decided to be compatible (S109). Then the display controller 42 generates the images representing the source document to which the processing indicated by the remaining setting items that have been decided to be compatible, and the processing indicated by the designated setting item (color printing) are applied, and causes the display unit 32 to display such images in a reduced size (S110).

FIG. 5 illustrates an example of the data table DT. As shown in FIG. 5, the data table DT indicates whether a given setting item is compatible with each of the remaining setting items, with respect to the plurality of setting items such as B/W printing, color printing, one-side printing, duplex printing, consolidation, blank margin, 90 degrees rotation, 180 degrees rotation, and addition of page number. For example, the display controller 42 looks up the data table DT to thereby select the remaining setting items except the B/W printing, since the B/W printing is incompatible with the color printing, while all other setting items are compatible with the color printing (S109). The display controller 42 then generates the source document images to each of which the processing indicated by one of the remaining setting items, and the processing of the color printing are applied, with respect to each of the remaining setting items that are compatible, and causes the display unit 32 to display such images on the screen, in a reduced size (S110).

Figure 6:
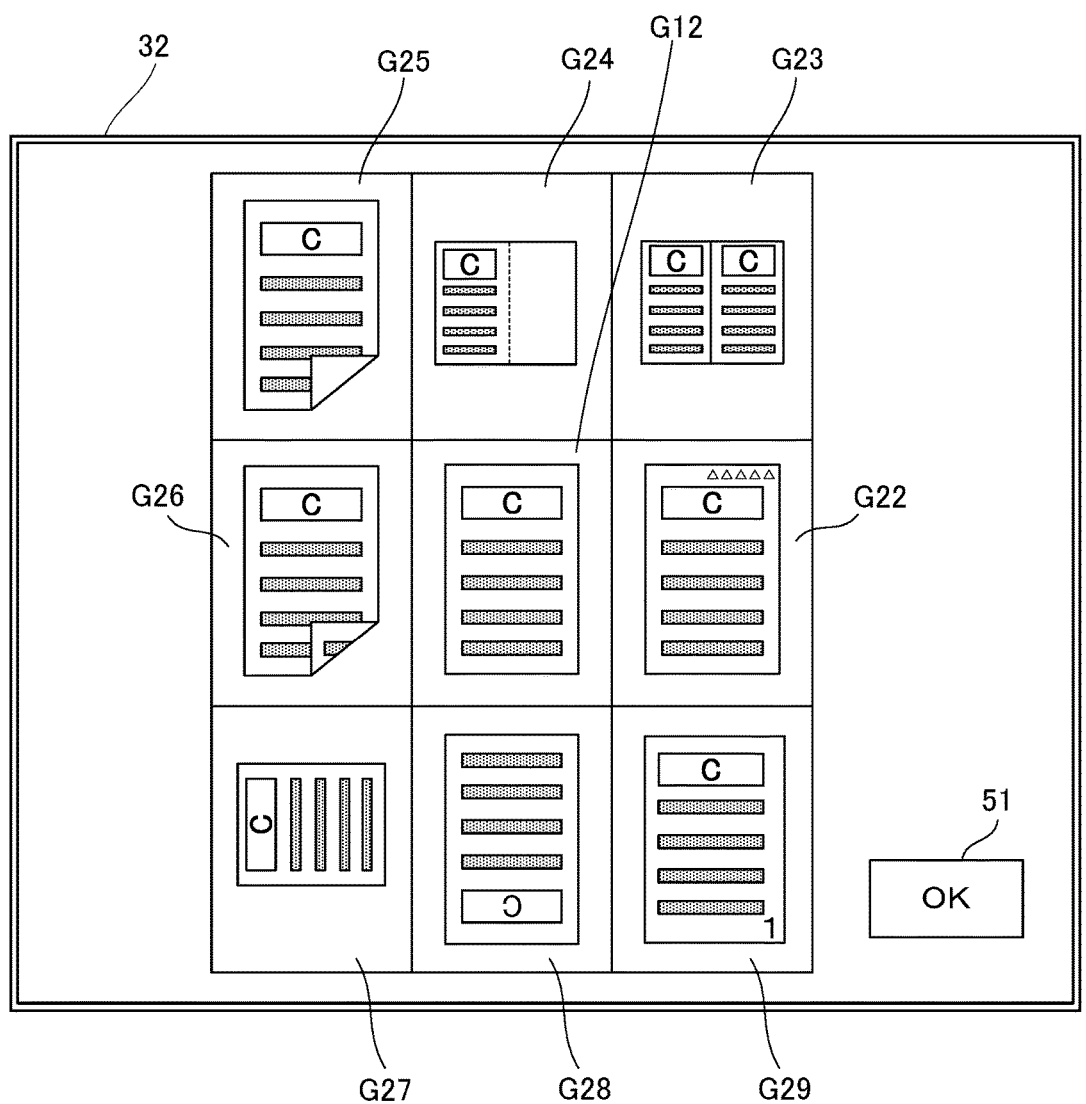
FIG. 6 is a schematic drawing showing a screen of a display unit continuously reducing and displaying the images designated by the user, but displaying, after the user designates one of the setting items for the image, the reduced source document images to each of which the processing indicated by one of the remaining setting items not designated by the user, and the processing indicated by the selected setting item are applied, with respect to each of the remaining setting items.

Proceeding to FIG. 6, as result of the above the source document image G12 to which the processing of color printing is applied is displayed in a reduced size at the center of the screen of the display unit 32, and also source document images G22 to G29, to each of which the processing indicated by one of the remaining setting items, and the processing of the color printing are applied, are displayed in a reduced size, with respect to each of the remaining setting items that have not been designated, such as one-side printing, duplex printing, consolidation, blank margin, 90 degrees rotation, 180 degrees rotation, and addition of page number.

Thereafter, the main controller 41 returns to the process subsequent to S103 and 5104, and stands by for an instruction made through the OK key 51, or any of the source document images G22 to G29. When the user touches the OK key 51 (Yes at S103), the main controller 41 establishes the setting of the setting item to be applied to the source document image G12 displayed at the center of the screen of the display unit 32, in other words the execution of the color printing of the source document image on the recording sheet (S105). The main controller 41 then causes the image forming unit 12 to print the source document image in color on the recording sheet, according to the image data representing the source document image stored in the storage unit 38 (S106).

In contrast, when the user touches any of the source document images G22 to G29 (Yes at S104), the main controller 41 accepts the instruction for executing the processing indicated by the setting item corresponding to the second designated source document image (S107).

Upon accepting the instruction for executing the processing indicated by the setting item corresponding to the second designated source document image, the display controller 42 erases the source document image G12 displayed at the center of the screen of the display unit 32, and instead generates a source document image to which the processing indicated by the setting item corresponding to the erased source document image (in this case, color printing of the source document image on the recording sheet), and the processing indicated by the setting item corresponding to the second designated source document image are applied, and then causes the display unit 32 to display such an image in a reduced size at the center of the screen (S108).

Further, the display controller 42 looks up the data table DT, to decide whether the remaining setting items are compatible with the color printing (setting item corresponding to the first designated source document image), and the processing indicated by the setting item corresponding to the second designated source document image, with respect to each of the remaining setting items that have not been designated, and selects the setting items that have been decided to be compatible (S109). Then the display controller 42 generates source document images to each of which the processing indicated by one of the remaining setting items that have been decided to be compatible, the processing of color printing, and the processing indicated by the setting item corresponding to the second designated source document image are applied, and causes the display unit 32 to display such images in a reduced size on the screen (S110). Thereafter, the process returns to S103.

When the user further touches the OK key 51 (Yes at S103), the main controller 41 establishes the setting of the two setting items to be applied to the source document image displayed at the center of the screen of the display unit 32, in other words the execution of the color printing and the processing indicated by the setting item corresponding to the second designated source document image (S105). The main controller 41 then causes the image forming unit 12 to print, on the recording sheet, the source document image to which the processings of the two setting items corresponding to the source document image, displayed in a reduced size at the center of the screen, are applied, according to the image data representing the source document image stored in the storage unit 38 (S106).

In contrast, when the user touches any of the source document images G22 to G28 (Yes at S104), instead of touching the OK key 51 (No at S103), the main controller 41 accepts the instruction for executing the processing indicated by the setting item corresponding to the third designated source document image designated (S107).

When the processing indicated by the setting items corresponding to the third designated source document image is designated, the display controller 42 erases the source document image displayed at the center of the screen of the display unit 32, and instead generates a source document image to which the processing indicated by the two setting items corresponding to the erased source document image (in this case, color printing and the processing indicated by the setting item corresponding to the second designated source document image), and the processing indicated by the setting item corresponding to the third designated source document image are applied, and then causes the display unit 32 to display such an image in a reduced size at the center of the screen (S108).

Further, the display controller 42 looks up the data table DT, to decide whether the remaining setting items are compatible with the processing indicated by the two setting items corresponding to the erased source document image (color printing and the processing indicated by the setting item corresponding to the second designated source document image), and the processing indicated by the setting item corresponding to the third designated source document image, with respect to each of the remaining setting items that have not been designated, and selects the setting items that have been decided to be compatible (S109). Then the display controller 42 generates source document images to each of which the processing indicated by one of the remaining setting items that have been decided to be compatible, the processing of color printing, the processing indicated by the setting item corresponding to the second designated source document image, and the processing indicated by the setting item corresponding to the third designated source document image are applied, and causes the display unit 32 to display such images in a reduced size on the screen (S110).

Thereafter, likewise, when the OK key 51 is touched (Yes at S103), the processings of the plurality of setting items corresponding to the source document image displayed in a reduced size at the center of the display unit 32 are established (S105), and the main controller 41 causes the image forming unit 12 to print the source document image to which the processings of the setting items are applied, on the recording sheet, according to the image data representing the source document image stored in the storage unit 38 (S106).

In contrast, when the user touches any of the other source document images (Yes at S104), the main controller 41 accepts the instruction for executing the processing indicated by the setting item corresponding to the n-th designated source document image designated (S107). Then the display controller 42 erases the source document image displayed at the center of the screen of the display unit 32, and instead a source document image, to which the processing indicated by the plurality of setting items corresponding to the erased source document image, and the processing indicated by the setting item corresponding to the n-th designated source document image are applied, is displayed in a reduced size at the center of the screen of the display unit 32 (S108).

Further, it is decided, based on the data table DT, whether the remaining setting items are compatible with the processing indicated by the plurality of setting items corresponding to the erased source document image, and the processing indicated by the setting item corresponding to the n-th designated source document image, with respect to each of the remaining setting items that have not been designated, and the setting items that are compatible are selected (S109). Then the display controller 42 displays the source document images, to each of which the processing indicated by one of the remaining setting items that are compatible, the processing indicated by the plurality of setting items corresponding to the erased source document image, and the processing indicated by the setting item corresponding to the n-th designated source document image are applied, in the screen of the display unit 32 in a reduced size (S110).

Now, in the case of selectively combining as above the plurality of setting items related to the printing, such as color printing, B/W printing, one-side printing, duplex printing, consolidation, blank margin, and 90 degrees rotation, it is difficult to recognize how the printed image will look like, as result of the combination of the selected setting items.

According to this embodiment, the source document images to each of which the processing indicated by one of the setting items is applied are displayed in the display unit 32, with respect to each of the plurality of setting items before the image forming unit 12 perform the printing operation. When the user designates one of such source document images, the instruction for processing indicated by the setting item corresponding to the designated image is accepted, and the display controller 42 displays the source document images to each of which the processing indicated by the designated setting item and the processing indicated by one of the remaining setting items are applied, with respect to each of the remaining setting items that have not been designated, in the display unit 32 in a reduced size. Therefore, the user can easily recognize, in view of the images displayed in a reduced size, how the image is generated and printed, when a plurality of setting items are applied in combination. Further, the user can easily input the printing instruction for the image to which the plurality of setting items are applied in combination, displayed as above in a reduced size.

As described thus far, the disclosure enables the user to easily recognize how the printed image will look like, when a plurality of setting items are applied in combination.

Here, although the plurality of source document images are displayed on the screen of the display unit 32 in the same size in the foregoing embodiment, the display controller 42 may display, when the OK key 51 is touched, only the source document image at the center of the screen, which is to be printed, in a larger size than the remaining source document images. In addition, when a pinch-out operation performed through the touch panel 35 on a given source document image is detected, the display controller 42 may display such source document image in an enlarged size. Conversely, when a pinch-in operation performed through the touch panel 35 on a given source document image is detected, the display controller 42 may display such source document image in a reduced size.

In addition, the display controller 42 may increase the number of images representing the source document, to each of which the processing indicated by one of the setting items is applied, when a pinch-out operation performed through the touch panel 35 on the entirety of the screen of the display unit 32 is detected. For example, sixteen setting items may be prepared in advance, out of which nine images may be displayed, as default setting, in a 3×3 pattern as in the foregoing embodiment, and the sixteen images may be displayed in a 4×4 pattern when the pinch-out operation is detected. Conversely, the display controller 42 may decrease the number of images representing the source document, when a pinch-in operation performed through the touch panel 35 on the entirety of the screen of the display unit 32 is detected. For example, in the case where sixteen setting items are prepared as above, the display of the sixteen images in the 4×4 pattern may be decreased to the display of the nine images in the 3×3 pattern, when the pinch-in operation is detected.

Alternatively, a multitude (e.g., 20) of setting items related to the printing of the source document image may be prepared in advance, and the display controller 42 may extract, for example, nine setting items in descending order of the frequency of use, out of the multitude of setting items. Then the display controller 42 may cause the display unit 32 to display the source document images to each of which the processing indicated by one of the setting items is applied, in a reduced size, as shown in FIG. 4, with respect to each of the nine setting items extracted as above.

Figure 7:
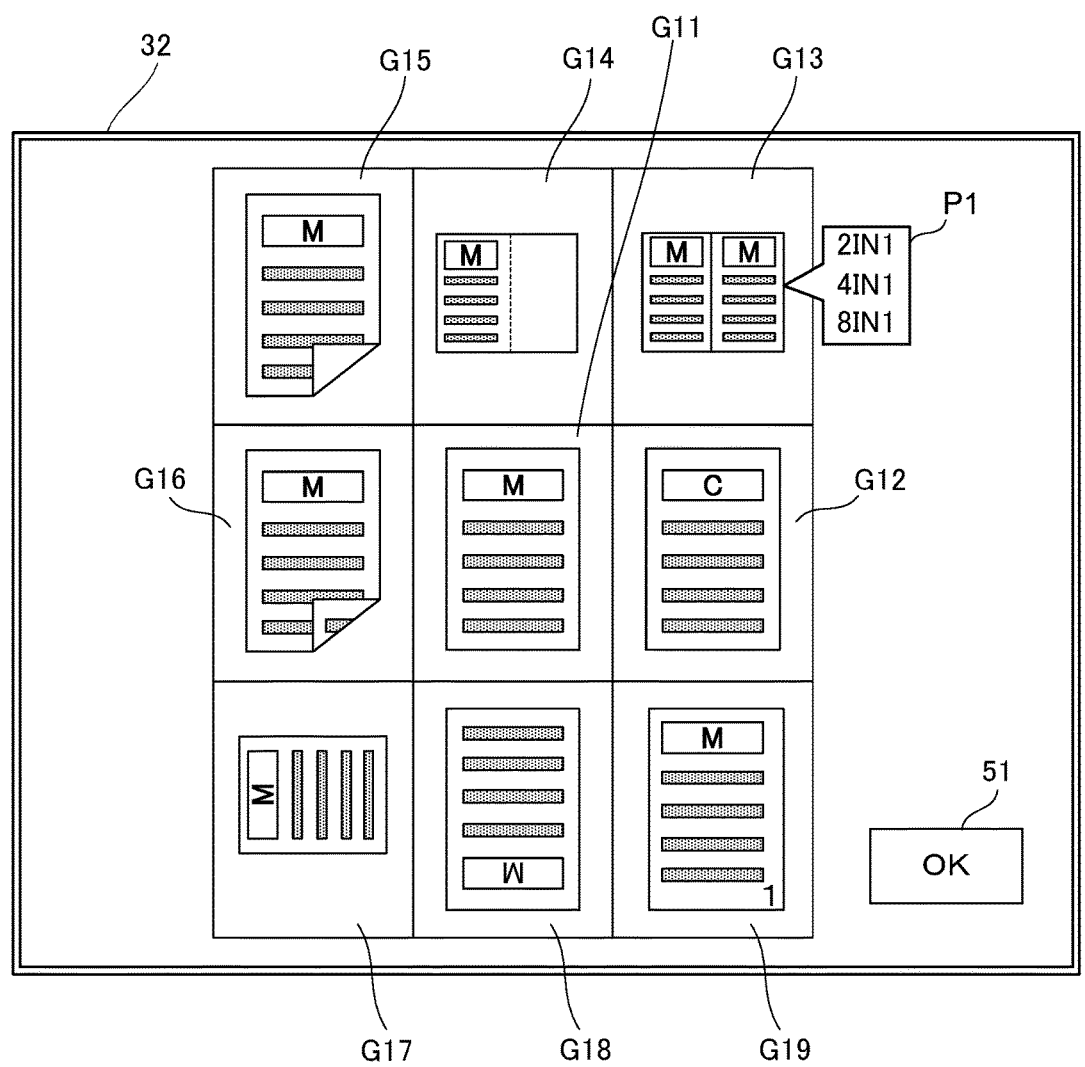
FIG. 7 is a schematic drawing showing another screen of a display unit, displaying source document images to each of which the processing indicated by the setting item is applied, with respect to each of the plurality of setting items.

Further, when a plurality of choices are available with respect to the processing indicated by a single setting item, for example when the choices of 2-in-1, 4-in-1 and so forth are available for the processing of consolidation, the display controller 42 may display a pop-up screen P1 for selecting one of a plurality of choices as shown in FIG. 7, when the source document image corresponding to the setting item of consolidation (e.g., image G13) is held down for a predetermined time, to allow the user to touch one of the display regions of the respective choices in the pop-up screen P1, to thereby input the selection of one of the choices displayed at the touched position. In this case, once such selection is inputted, the display controller 42 may generate a source document image to which the processing of the inputted choice is applied, and display such an image in place of the image thus far displayed. For example, in the case where the source document image to which the 2-in-1 consolidation is applied has thus far been displayed, the display controller 42 may generate and display the source document image to which the 4-in-1 consolidation, which is the inputted choice, is applied.

Figure 8:
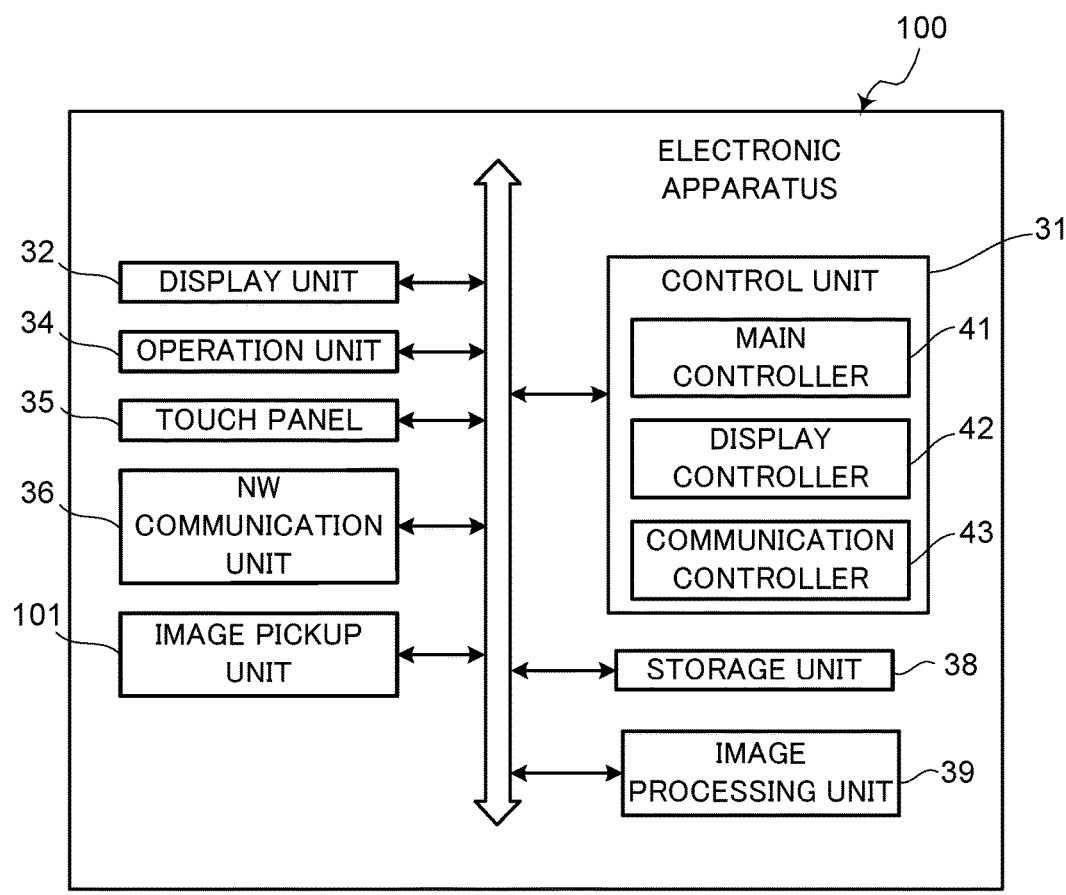
FIG. 8 is a block diagram showing an essential internal configuration of an electronic apparatus according to the embodiment.

Still further, although the foregoing embodiment represents the image forming apparatus, the disclosure is broadly applicable to different electronic apparatuses. For example, as shown in FIG. 8, the disclosure is applicable to an electronic apparatus 100 such as a smartphone, having an image pickup unit 101 such as a camera. In this case, the electronic apparatus 100, for example the smartphone, may include those components shown in FIG. 2, except the FAX communication unit 37, the image reading unit 11, and the image forming unit 12. The main controller 41 causes the display unit 32 to display the image shot by the image pickup unit 101.

In the smartphone, the display controller 42 causes the display unit 32 to display, when the image shot by the image pickup unit is to be displayed on the screen of the display unit, the reduced images to each of which the processing indicated by one of the setting items is applied, with respect to each of the plurality of setting items related to the image processing, in the same manner as displaying the source document images in the image forming apparatus 1.

In this case also, when the user designates one of the setting items by touch operation, the display controller 42 accepts an instruction to apply the setting item corresponding to the designated image, and generates images to each of which the processing indicated by one of the remaining setting items, and also the processing indicated by the designated setting item are applied, with respect to each of the remaining setting items not designated by the user. Therefore, the user can easily recognize how the displayed image will look like, when some of the setting items are selectively combined.

The disclosure is not limited to the foregoing embodiments, but may be modified in various manners. The configurations and processings described with reference to FIG. 1 to FIG. 7 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
    an image forming unit that prints a source document image on a recording sheet;
    a display unit;
    an operation unit to be operated by a user; and
    a controller that (i) causes, before causing the image forming unit to print the source document image, the display unit to reduce and display, with respect to each of a plurality of setting items related to printing of the source document image, source document images, to each of which a processing indicated by one of the plurality of setting items is applied,
    (ii) accepts, when the user designates, by operating the operation unit, one of the source document images to each of which the processing indicated by one of the plurality of setting items is applied, an instruction to apply a processing indicated by a designated setting item corresponding to a designated source document image, and causes, when an OK key is operated, the image forming unit to print the source document image by the processing of the setting item accepted, and
    (iii) causes the display unit to reduce and display the source document images, to each of which the processing indicated by one of remaining setting items not designated by the user, and the processing indicated by the designated setting item corresponding to the designated source document image, are applied, with respect to the remaining setting items,
    wherein the controller (iv) decides, when the user designates, by operating the operation unit, one of the source document images to each of which the processing indicated by one of the plurality of setting items is applied, whether the processing indicated by the remaining setting items are compatible with the processing indicated by the designated setting item, with respect to each of the remaining setting items not designated by the user, and
    (v) causes the display unit to reduce and display the source document images to each of which the processing indicated by one of the remaining setting items decided to be compatible, and the processing indicated by the designated setting item are applied.

2. The image forming apparatus according to claim 1, wherein the controller sequentially (i) accepts, each time the user designates, by operating the operation unit, one of the source document images to each of which the processing indicated by one of the plurality of setting items is applied, the instruction to apply the processing indicated by the designated setting item corresponding to the designated source document image, and causes, when the OK key is operated, the image forming unit to print the source document image by all of the processing of the setting item accepted, and (ii) causes the display unit to reduce and display the source document images, to each of which the processing indicated by one of the remaining setting items, and the processing indicated by all of designated setting items are applied, with respect to the remaining setting items not designated by the user.

3. The image forming apparatus according to claim 1, wherein the controller extracts a predetermined number of setting items in descending order of frequency of use, out of the plurality of setting items related to printing of the source document image, and causes the display unit to reduce and display the source document images to each of which the processing indicated by one of extracted setting items is applied, with respect to each of the extracted setting items.

4. The image forming apparatus according to claim 1, wherein the operation unit includes a touch panel provided on a screen of the display unit, and
the controller accepts the instruction with respect to the source document images to each of which the processing indicated by one of the plurality of setting items is applied, according to a touch operation performed by the user on the touch panel.

5. The image forming apparatus according to claim 4, wherein the controller causes the display unit to enlarge and display or reduce and display, when the user instructs, by the touch operation on the touch panel, an enlarged display or a reduced display of one of the source document images to which the processing indicated by the designated setting item is applied, the designated source document image.

6. The image forming apparatus according to claim 4, wherein the controller causes the display unit to increase or decrease a number of the source document images, displayed on the display unit and to each of which the processing indicated by one of the plurality of setting items is applied, when the user instructs, by the touch operation on the touch panel, to increase or decrease the number of the source document images, displayed on the display unit, to each of which the processing indicated by one of the plurality of setting items is applied.

7. The image forming apparatus according to claim 1, further comprising an image reading unit that reads the source document image,
wherein the controller causes the display unit to reduce and display the source document images, read by the image reading unit, to each of which a processing indicated by one of the plurality of setting items is applied.

8. The image forming apparatus according to claim 1, further comprising an image processing unit that processes the source document image,
wherein the setting item indicates the processing to be executed by the image processing unit on the source document image.

9. The image forming apparatus according to claim 8, wherein the controller causes the display unit to display one source document image not subjected to the processing by the image processing unit, and to which a default setting item of one of the plurality of setting items is applied, at a central position of the screen of the display unit, and to display the plurality of the other source document images to each of which the processing indicated by one of the remaining setting items is applied, around the one source document image to which the default setting item is applied.

10. The image forming apparatus according to claim 9, wherein, when the user designates a given image by operating the operation unit, the controller causes the display unit to display (i) the source document image to which the processing indicated by the setting item corresponding to the source document thus far displayed at the central position of the display unit, and the processing indicated by the setting item corresponding to the designated image are applied, at the central position of the display unit, and (ii) the source document images to each of which the processing indicated by one of the remaining setting items, the processing indicated by the setting item corresponding to the source document image thus far displayed at the central position of the display unit, and the processing indicated by the setting item corresponding to the designated image are applied, around the source document image now displayed at the central position of the display unit.

11. The image forming apparatus according to claim 10, wherein the controller causes the display unit to display the source document image located at the central position of the display unit in a larger size than the remaining source document images, when the user designates a given image by operating the operation unit.

12. An electronic apparatus comprising:
a display unit;
an operation unit to be operated by a user; and
a controller that (i) causes the display unit to reduce and display, with respect to each of a plurality of setting items related to image processing, images to each of which a processing indicated by one of the plurality of setting items is applied, and (ii) causes the display unit to reduce and display, when the user designates, by operating the operation unit, one of the images to each of which the processing indicated by one of the plurality of setting items is applied, the images to each of which the processing indicated by one of remaining setting items not designated by the user, and the processing indicated by the setting item designated by the user, are applied, with respect to each of the images corresponding to the remaining setting items,
wherein the controller (iv) decides, when the user designates, by operating the operation unit, one of the source document images to each of which the processing indicated by one of the plurality of setting items is applied, whether the processing indicated by the remaining setting items are compatible with the processing indicated by the designated setting item, with respect to each of the remaining setting items not designated by the user, and (v) causes the display unit to reduce and display the source document images to each of which the processing indicated by one of the remaining setting items decided to be compatible, and the processing indicated by the designated setting item are applied.

13. The electronic apparatus according to claim 12, further comprising an image pickup unit that shoots an image,
wherein the controller causes the display unit to reduce and display the image shot by the image pickup unit.

* * * * *